UNITED STATES PATENT OFFICE.

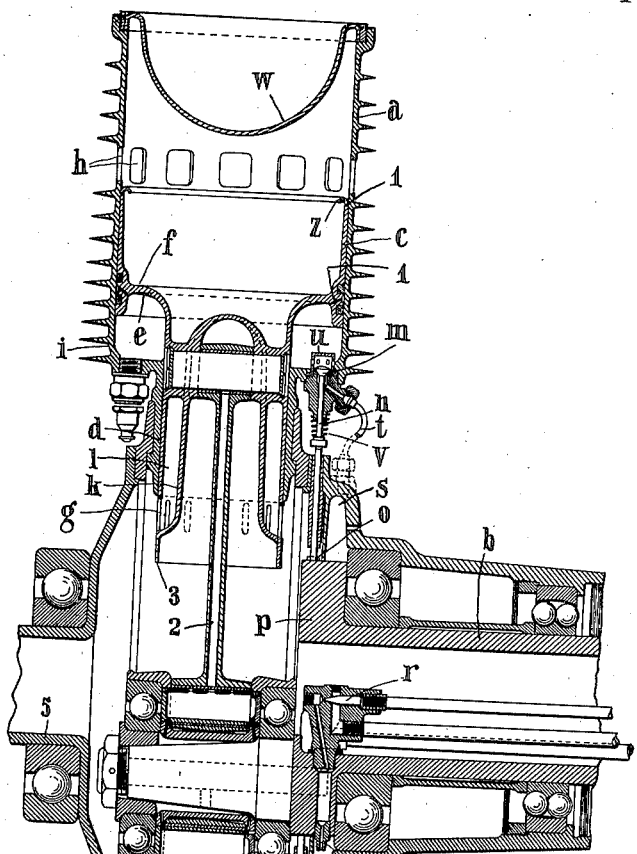
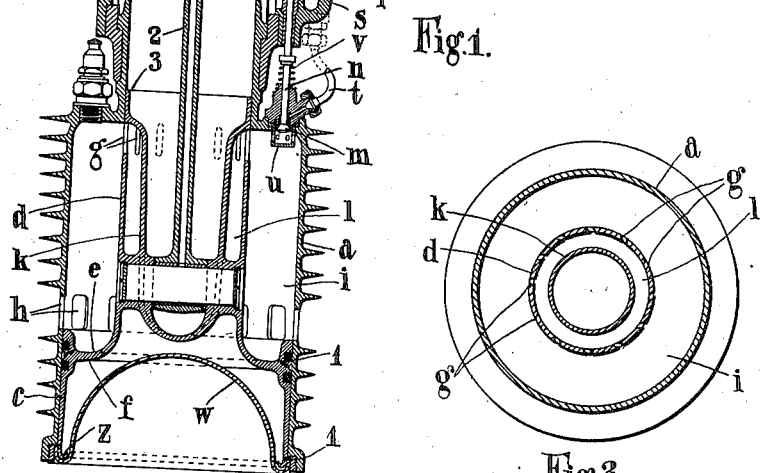

ROBERT HUTCHISON ANDERSON, OF EDINBURGH, SCOTLAND, AND JOHN HOLT THOMAS, OF IPSWICH, ENGLAND.

TWO-STROKE-CYCLE INTERNAL-COMBUSTION ENGINE.

1,315,176.  Specification of Letters Patent.  Patented Sept. 2, 1919.

Application filed October 11, 1917. Serial No. 196,068.

*To all whom it may concern:*

Be it known that we, ROBERT HUTCHISON ANDERSON, a subject of the King of Great Britain and Ireland, and residing at 27 Inverleith Row, Edinburgh, Scotland, and JOHN HOLT THOMAS, a subject of the King of Great Britain and Ireland, and residing at Ashmere Grove, Ipswich, in the county of Suffolk, England, have invented certain new and useful Improvements in Two-Stroke-Cycle Internal-Combustion Engines, of which the following is a specification.

This invention relates to two-stroke cycle internal combustion engines of the rotary cylinder type, and has for its principal object to devise improvements in the construction and mode of operation of such engines as will increase its efficiency, while at the same time increasing the amount of power obtainable from an engine of given weight as compared with known engines of this type, and simplifying the construction of the engine by arranging, *inter alia,* for the piston rods to be always in tension so that a master connecting rod becomes unnecessary.

The invention consists in an internal combustion engine of the two-stroke cycle rotary cylinder type, comprising a plurality of cylinders, each of which is formed of two diameters, the piston for each cylinder also formed of two corresponding diameters and adapted to control ports in the cylinder walls and provided in its lower portion with transfer ports, and an internal sleeve fitted to, or formed in one with, the lower part of each piston.

Other features of the invention will be apparent from the description given hereafter.

The accompanying drawings illustrate one form of internal combustion engine in accordance with the invention.

Figure 1 being a side sectional elevation.

Fig. 2 a front view of a portion of the engine; while

Fig. 3 is a sectional view illustrating a detail.

Figure 2:
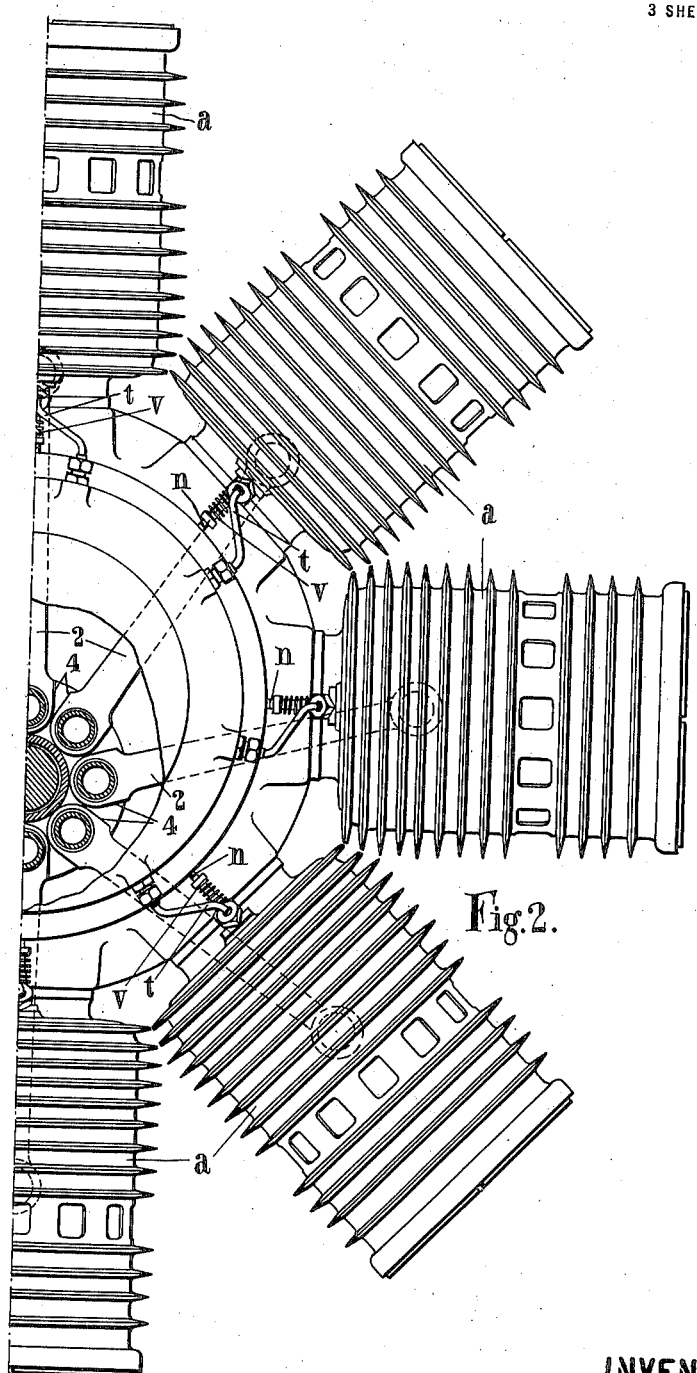
Figure 4:
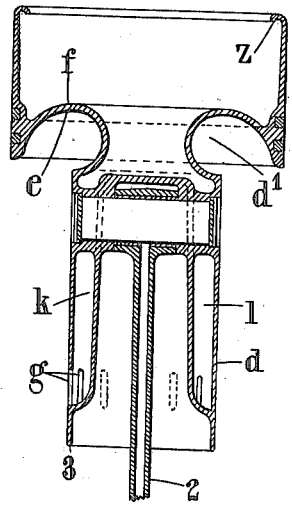
Fig. 4 shows a detail of the piston.

In carrying our invention into effect in the manner illustrated, we provide any desired or suitable number of cylinders $a$, around a fixed crank shaft $b$ to which the pistons of the respective cylinders are connected, and each cylinder we make of two different diameters with a piston formed of two portions $c$, $d$ of corresponding differential diameters working therein. The inner end face $e$ of the outer and larger part of the piston constitutes the working face of the piston while the outer face $f$ of such part constitutes the compression face, and the inner or smaller part of the piston $d$ serves as a guide and is provided at its inner end with a number of peripheral ports or openings $g$ serving as transfer ports in the manner hereinafter indicated in the description of the cycle of operations. The larger part of the cylinder is provided about midway of its length with a number of ports or openings $h$ arranged circumferentially in the cylinder wall, such ports serving alternately as exhaust ports from the working cylinder and air admission ports to the compression cylinder. The annular chamber $i$ between the wall of the larger portion of the cylinder and that of the smaller portion of the piston constitutes the working chamber of the engine, and to reduce the diameter of the engine to cause churning of the air on the compression stroke and to reduce the obstruction of the trunk when the charge is ignited the clearance space is formed in the piston by reducing the diameter of the piston trunk $d$ where it joins the larger diameter $c$ as shown at $d'$ in Fig. 4.

That portion of the piston which is of smaller diameter is provided or formed with an internal sleeve or fitting $k$ forming between its outer face and the inner face of the piston an annular chamber $l$ which communicates with the upper or compression face of the larger portion of the piston. The working cylinder is furnished with a fuel inlet port or passage adapted to be controlled by a valve $m$ actuated by any suitable means as, for example, by means of a spring-controlled tappet rod $n$ actuated by a cam $o$ on the crank disk $p$, and we utilize centrifugal force or other means to inject the liquid fuel into the working cylinder at the appropriate time, it being understood that the utilization of centrifugal force for fuel injection on a rotary engine is not in itself new. For example we may arrange for the fuel to be supplied through a supply nozzle or jet $q$ preferably controlled by a needle valve or like mechanism $r$, into a chamber $s$ which rotates with the rotating cylinder and which is piped to the respective cylinders by means of suitable connections $t$ through which the oil is forced under the action of centrifugal force engendered by the rotation of the engine, and thence through the inlet port at the moment of opening by the mechanically actuated valve above referred to.

The oil enters the chamber $s$ and sufficient collects behind the valve $m$ to be injected into the cylinder at the moment of opening the valve.

By such an arrangement the centrifugal force produces a head of petrol in each of the pipes $t$ and this head is adjusted automatically at varying speeds. When the valve $m$ is opened the petrol is thus injected under pressure into the cylinder and the loss of head in the pipe $t$ due to the injection is automatically made up during the continued rotation of the engine.

At starting the oil flows into the space behind the lowermost injection valve by gravity, but does not enter the cylinder until the engine rotates to such position that the cam $o$ opens this injection valve, in which position the flow of oil is to the next injection valve which then becomes the lowermost. When in this position the first injection valve opens and only that oil which is held in that space above this valve enters the cylinder. If desired, a perforated thimble $u$ is fitted to prevent the valve falling into the cylinder in the event of the spring $v$ controlling the valve breaking.

The end cover $w$ and the outer end of the cylinder may be as shown in the drawings or may be provided with tapered faces and the cover is screwed into cylinder end and for the purpose of assisting the lubrication of the piston, the latter is provided with an inturned lip $z$ and oil holes 1 to gather and distribute the oil that collects by centrifugal force in the cool compressor head between the piston and cylinder wall. By changing the end covers $w$ the compression can be altered and the engine made effective for work at various heights.

The cycle of operations in an engine as above described may be conveniently referred to in connection with the compression and working sides of the piston, it being understood that the actions take place simultaneously.

Assuming the piston to be approaching the inner end of its stroke, the ports $h$ open to atmosphere while the transfer ports $g$ open to the crank chamber, and, owing to a partial vacuum in the compressor, air at once flows into and fills the upper part of the cylinder to an amount equal to, say, one and one-half times the volume of air required for the working cylinder. On the next or outward stroke as soon as the ports $h$ are closed by the piston, this air is compressed and when the transfer ports $g$ overrun the sleeve formed by small diameter of the cylinder is delivered to the working cylinder.

The amount of compression of the air is arranged by shape of cylinder end $w$ so that when connection is made to the working cylinder there will be no very great difference of pressures and equalizations of pressure will occur.

The exhaust ports $h$ are formed as large as possible circumferentially as will allow the equalized pressures of the working cylinder and compressor to fall to say 16 lbs. per square inch (absolute) when working at the required height and required revolution of engine, but the exhaust ports are made with as little depth as possible so that the pressure will not fall to atmospheric before the exhaust ports are closed by the return stroke.

On the working side of the piston, the latter moving inward closes the exhaust ports $h$ from the working cylinder and at this moment fuel is injected thereinto by centrifugal force or other means and is mixed with the air by the method already described; thereafter the continued inward movement of the piston compresses the air in the working cylinder and the fuel which is atomized by the injection under pressure thoroughly permeates the air in said cylinder and at the appropriate moment toward or at the end of the inward stroke the charge is fired in any suitable or desired manner and therafter the outward or working stroke ensues. Toward the end of the working stroke the transfer ports $g$ are opened, allowing equalization of pressures and being preceded by the opening of the exhaust so that on the return stroke when the engine is running at normal speed the pressure will be reduced to, say, 16 lbs. or some other fixed pressure and not atmospheric (unless required) as is the case with the usual two-stroke cycle although the latter mode of operation of the engine may be employed.

With an engine constructed and arranged as above described, with differential cylinders, the smaller parts of which are attached to the crank casing, the connecting rods 2 will always be in tension so that a master connecting rod may be eliminated, and in order that the connecting rods may not, in any extreme position, contact with and damage or be damaged by the lower end 3 of the piston, they are preferably provided at their inner ends with shouldered portions 4 so that these shall act as stops to prevent the trouble above referred to, i. e. in extreme angular positions the squared portions of adjacent rods will contact with one another and thus prevent the stem of the rod coming into contact with the piston.

Fig. 3 shows the preferred arrangement of the transfer ports *g*, namely, tangential to the cylinder so that the air passing through will acquire a whirling motion and assist the mixing of the air and fuel in the working cylinder.

It is to be understood that the foregoing details are given by way of example only and that the details of construction and arrangement of the various parts relatively to one another, as also the manner of injecting and controlling the supply of fuel may be suitably modified to suit the form of construction of engine to which the invention is to be applied, and similarly the examples of volumes given above may be varied to suit any particular practical requirements.

Figure 6:
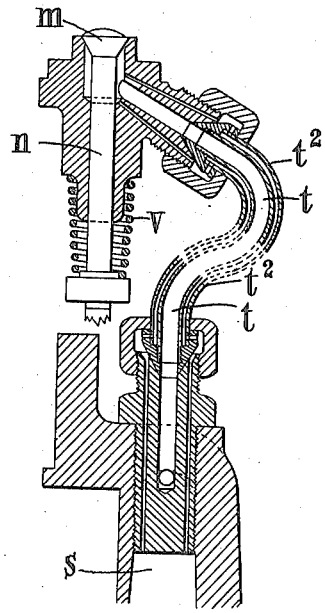
Figs. 5 and 6 illustrate further details.
Figure 5:
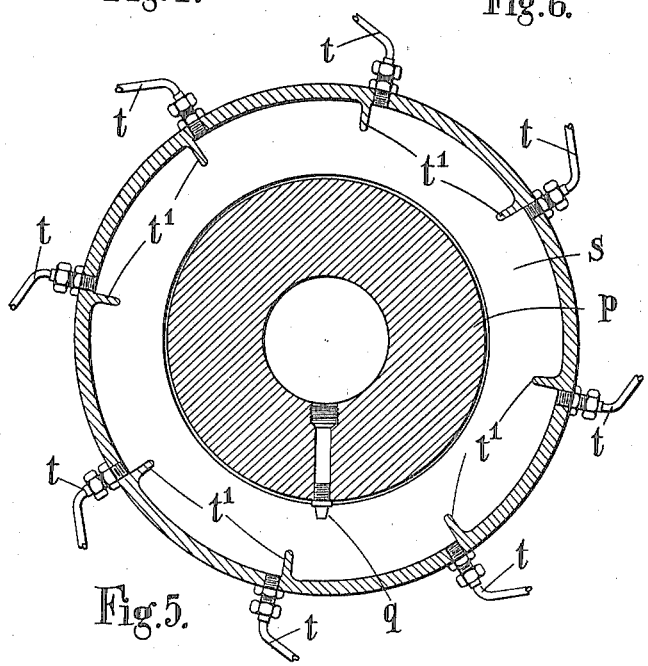

Again, the chamber *s* may be formed (as shown in Fig. 5) with partitions *t'*, or (as shown in Fig. 6) the oil pipes may be inclosed by air return pipes $t^2$ forming partitions.

Again it will be obvious that the injection valve may take any one of a large variety of forms as, for example, it may be slotted or ribbed or otherwise formed to assist in breaking up the fuel, and the cam for operating the valves may be adjustable either for point of opening or for amount of opening or time of opening, or for any two of such, or for all of these factors.

Having now described our invention, what we claim as new and desire to secure by Letters Patent is:—

1. An internal combustion engine of the two-stroke cycle type comprising a plurality of rotary cylinders, each of which is formed of two diameters, a piston for each cylinder also formed of two corresponding diameters and adapted to control ports in the cylinder walls and provided in its lower portion with an annular chamber communicating with the compression face of the larger portion of the piston and with tangential ports at the lower end of said chamber, and a fixed crank shaft common to all of said pistons.

2. An internal combustion engine of the two-stroke cycle type comprising a plurality of rotary cylinders, each of which is formed of two diameters, a piston for each cylinder also formed of two corresponding diameters and adapted to control ports in the cylinder walls and provided in its lower portion with transfer ports, an internal sleeve fitted to the lower part of each piston and forming therewith an annular chamber communicating with the compression face of the larger portion of the piston, and a fixed crank shaft common to all of said pistons.

3. An internal combustion engine of the two-stroke cycle type comprising a plurality of cylinders, each of which is formed of two diameters, a piston for each cylinder also formed of two corresponding diameters and adapted to control ports in the cylinder walls and provided in its lower portion with transfer ports, an internal sleeve fitted to the lower part of each piston and forming therewith an annular chamber communicating with the compression face of the larger portion of the piston, a fuel admission pipe for each cylinder, means whereby a head of fuel will be produced in each fuel admission pipe by centrifugal force, a valve controlling the outlet of each fuel admission pipe and a fixed crank shaft common to all of said pistons.

4. An internal combustion engine of the two-stroke cycle type comprising a plurality of cylinders, each of which is formed of two diameters, a piston for each cylinder also formed of two corresponding diameters and adapted to control ports in the cylinder walls and provided in its lower portion with transfer ports, a stationary crank shaft and connecting rods connecting said pistons with said crank shaft, the inner ends of said connecting rods being provided with enlargements formed with shouldered portions adapted to contact whereby to prevent engagement of the rods with the pistons.

5. An internal combustion engine of the two-stroke cycle type comprising a plurality of cylinders, each of which is formed of two diameters, a piston for each cylinder also formed of two corresponding diameters and adapted to control ports in the cylinder walls and provided in its lower portion with tangential transfer ports, an internal sleeve fitted to the lower part of each piston, and forming therewith an annular chamber communicating with the compression face of the larger portion of the piston, a fuel admission pipe for each cylinder, means whereby a head of fuel will be produced in each fuel admission pipe by centrifugal force and a fixed crank shaft common to all of said pistons.

In testimony whereof we have signed our names to this specification.

ROBERT HUTCHISON ANDERSON.
JOHN HOLT THOMAS.